United States Patent [19]
Hamilton et al.

[11] 3,779,815
[45] Dec. 18, 1973

[54] APPLYING CHROMIC ACID-AMINO ACID, OR LACTAM, OR AMIDE COATING COMPOSITIONS TO METALS

[75] Inventors: Donald N. Hamilton, Painesville; Alexander W. Kennedy, Chardon, both of Ohio

[73] Assignee: Diamond Shamrock Corporation, Cleveland, Ohio

[22] Filed: Jan. 3, 1972

[21] Appl. No.: 215,085

Related U.S. Application Data

[63] Continuation-in-part of Ser. No. 41,665, May 21, 1970, abandoned, which is a continuation of Ser. No. 721,601, April 16, 1968, abandoned.

[52] U.S. Cl. .................................. 148/6.2, 106/14
[51] Int. Cl. ............................................. C23f 7/26
[58] Field of Search................... 148/6.2, 6.21, 6.27; 106/14; 252/390

[56] References Cited
UNITED STATES PATENTS

| | | | |
|---|---|---|---|
| 3,307,980 | 3/1967 | Freeman | 148/6.21 |
| 2,045,286 | 6/1936 | Tosterud | 148/6.2 |
| 2,171,545 | 9/1939 | Edwards et al. | 148/6.2 |
| 2,285,468 | 6/1942 | Slunder | 148/6.2 X |
| 2,784,122 | 3/1957 | Cox et al. | 148/6.2 |
| 3,382,081 | 5/1968 | Cutter et al. | 148/6.2 X |
| 3,519,501 | 7/1970 | Holden et al. | 148/6.2 |
| 3,535,166 | 10/1970 | Hamilton | 148/6.2 |
| 3,535,167 | 10/1970 | Ridder et al. | 148/6.2 |
| 3,578,508 | 5/1971 | Pearlman | 148/6.2 |

*Primary Examiner*—Ralph S. Kendall
*Attorney*—Roy Davis et al.

[57] ABSTRACT

Corrosion-inhibiting, hexavalent-chromium-containing coating compositions for ferruginous metal surfaces are prepared with chromic acid in combination with a compound containing the structure —CONH—, or amino acid, or their mixtures, which are free from sulphur, hydroxyl, or halogen groups. After coating, the compositions are cured on the ferruginous surface at elevated temperature to augment the bonding of the resulting residue to such surface. Subsequently, surfaces containing typically less than 600 milligrams per square foot of the residue exhibit enhanced paint adhesion and, for weldable substrates retain weldability without deleterious effect to the corrosion resistance imparted by the residue.

3 Claims, No Drawings

APPLYING CHROMIC ACID-AMINO ACID, OR LACTAM, OR AMIDE COATING COMPOSITIONS TO METALS

CROSS REFERENCE TO RELATED APPLICATIONS

This application is a continuation-in-part of application Ser. No. 41,665 filed on May 21, 1970, now abandoned, which application is in turn a continuation of Ser. No. 721,601 filed April 16, 1968 and now abandoned.

BACKGROUND OF THE INVENTION

In U.S. Pat. No. 3,382,081 of P. R. Cutter and D. N. Hamilton, it has been disclosed that desirable corrosion-inhibiting, hexavalent-chromium-containing coatings can be formed with chromic acid solutions wherein substantially all of the chromium is contained as hexavalent chromium, when the solution also contains an organic dicarboxylic acid, such as succinic acid, which may also be in combination with, for example, an amino-substituted compound such as acrylamide, or the amino acid aspartic acid. Upon curing applied coatings, e.g., as applied on a metal substrate, the resulting treated metal surface in addition to corrosion resistance may also have enhanced adhesion for subsequently applied paints.

SUMMARY OF THE INVENTION

It has now been found that this particular combination of desirable features, e.g., corrosion-resistance, adhesion promotion for subsequently applied paints, weldability without deleterious effect on corrosion-resistance, and the like, can be obtained by supplying a chromic acid dispersion, free from organic dicarboxylic acids, with a single, specific, organic compound for the organic component, or by a mixture of such specific compounds. More particularly, the organic component is made up with one or more amino acids, or compounds containing the structure —CONH—, which are free from sulphur, hydroxyl, or halogen substituents. Additionally, these newly found coating compositions after application and curing provide enhanced resistance for the metal substrate to the deleterious effects of condensing humidity, when compared with such resistance provided by films of the dicarboxylic acid-containing compositions from the copending application mentioned above.

In a broad sense the present invention is directed to a corrosion-inhibiting, coating composition for ferruginous metal surfaces which comprises a volatile liquid having dispersed therein: (A) chromic acid in an amount sufficient to provide above about 25 milligrams of chromium per square foot of coated substrate; and (B) an organic component which is composed of compounds of the formula 1:

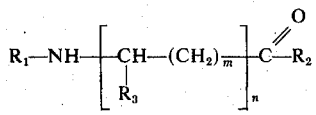

wherein $n$ is an integer from zero through 1, both inclusive, and $m$ is an integer from zero through 5, both inclusive. When $n$ is zero in the foregoing formula, and (a) when $R_1$ and $R_2$ are taken separately, $R_1$ represents a member selected from the group consisting of hydrogen, R', and substituted R', and $R_2$ represents a member selected from the group consisting of hydroxyl, carbamyl, R', and substituted R'; with the proviso that $R_1$ and $R_2$ may not be substituted R' together; and wherein the substituted R' may be substituted with at least one member selected from the group consisting of carboxyl, carbamyl, and a substituent of the formula 2

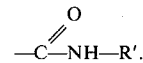

When $n$ is zero in the foregoing formula, and (b) when $R_1$ and $R_2$ are taken together, they represent a heterocyclic ring having ring atoms selected from the group consisting of carbon and nitrogen, (i) wherein the nitrogen atoms are represented in said ring by the structure —NH—CO—, and (ii) wherein heterocyclic ring carbon atoms have substituents selected from the group consisting of hydrogen, R', an aromatic ring, wherein two adjacent aromatic ring carbon atoms form a portion of the heterocyclic ring, and oxo with only one carbon atom adjacent a nitrogen atom bearing an oxo substituent.

When n is one in the foregoing formula, $R_2$ is —OH, or "hydroxyl", it being understood that in this instance the hydroxyl can be tolerated at it enters into the formation of a carboxyl group, and (c) when $R_1$ and $R_3$ are taken separately, $R_1$ is selected from the group consisting of hydrogen, alkyl, and aryl, and $R_3$ is selected from the group consisting of hydrogen, R', and substituted R' wherein said substituted R' may be substituted with at least one member selected from the group consisting of amino, carboxyl, carbamyl, guanidino, ureido, imidazolyl, and indolyl.

When $n$ is one in the foregoing formula, and (d) when $R_1$ and $R_3$ are taken together they represent a heterocyclic ring having ring atoms selected from the group consisting of carbon and nitrogen with substituted ring nitrogen atoms and substituted ring carbon atoms bearing radicals selected from the group consisting of hydrogen and R'. Also, when used hereinabove, or hereinafter, R' represents a member selected from the group consisting of alkyl, cycloalkyl, alkenyl, aryl, alkaryl, and aralkyl, unless otherwise specifically detailed, it being also understood that by "alkyl" herein, each instance, is meant lower alkyl of less than five carbon atoms.

Furthermore, the total weight of substituents from the (B) component is from about 1 to 100 grams per liter of coating composition, with the mole ratio of $CrO_3$ to the total of such (B) component substituents being within the range of about 9:1 to about 0.7:1.

Additionally this invention relates to a method for protecting metal substrate surfaces with an adherent, corrosion-resistant, hexavalent-chromium-containing coating composition, and further relates to articles thus prepared.

DESCRIPTION OF THE PREFERRED EMBODIMENTS

The hexavalent-chromium-containing coating composition of this invention are often referred to herein, for convenience, simply as "coating compositions", or as "chromic acid compositions", or, because of the adherency of resulting residues to a ferruginous metal substrate after curing, as a "bonding" coating composition. The metal substrate surfaces which can be protected by such coating compositions are the ferruginous substrates, e.g., iron, stainless steel or steel such as cold rolled steel.

The chromic acid is present in the composition in an amount sufficient to provide above about 25 milligrams of chromium per square foot of coated ferruginous substrate. In the composition itself, although lesser amounts may be present, especially in an immersion coating application when the immersion is repeated to build up the coating, there is generally present above about 25 grams per liter of chromic acid. Preferably, in single-step immersion operation the composition contains above 35 grams per liter of chromic acid to supply the needed chromium in the coating, i.e., 25 milligrams per square foot. More than 25 milligrams per square foot, and preferably greater than 35 milligrams of chromium per square foot of coated substrate are needed to provide significant enhancement in substrate corrosion resistance.

For economy, the composition does not contain in excess of about 400 grams per liter of chromic acid. It is to be understood that a minor amount of the chromic acid may be supplied by ammonium dichromate for the purposes of this invention. Moreover, lesser amounts of other water soluble salts of chromic acid, e.g., sodium dichromate, can be present in the composition for supplying a portion only of hexavalent chromium; but, after curing of the applied composition, a water rinse should be employed to enhance the corrosion resistance of the final coated surface.

For economy, water is the preferred liquid dispersion medium. When water is employed, essentially all of the compositions of this invention are solutions and water is the composition solvent. However, when materials which are insoluble or not readily soluble in water are present in water-based compositions, the resulting coating composition is prepared as a dispersion and hence the term "dispersion" is employed herein for convenience to refer to both composition solutions as well as such dispersions.

However, for many substituents which are only sparingly soluble in water, a nonaqueous liquid, in which both chromic acid and the organic component of the solution are soluble, which liquid must also be one that is not readily oxidized by chromic acid, may be used. Tertiary butyl alcohol is the preferred organic liquid, readily dissolving the chromic acid, and, for example, many higher molecular weight compounds, as well as being relatively stable in aqueous chromic acid solutions at ordinary temperatures encountered during application and/or storage of the bonding coating composition. Other alcohols are less desirable because of the limited solubility of chromic acid therein or because they are readily oxidized by the chromic acid. Advantageously, the liquid employed is a "volatile liquid", i.e., has a boiling point of about 100°C. or less at a pressure of 760 mm. Hg. to permit rapid drying of the applied coating composition.

In the foregoing formula 1 when $n$ is one, $R_2$ is hydroxyl, and when $R_1$ and $R_3$ are either taken separately or when they are taken together the resulting compounds represented by the formula are more conveniently referred to herein as amino acids. By the use of the term "amino acids" herein is meant an organic carboxylic acid in which a portion of the non-acid hydrogen has been replaced by one or more amino nitrogens, i.e., has been replaced by at least one nitrogen having two hydrogen substituents, as for example in the amino acid alanine, or by at least one nitrogen having only one hydrogen substituent, for example, the ring nitrogen in the amino acid proline. It is not contemplated to use amino acids containing sulphur such as the amino acid methionine, or to use such acids containing hydroxyl groups as in serine, or such compounds having halogen substituents, e.g., the iodine-containing amino acid thyroxine. Coating compositions containing such acids can be deleteriously oxidized by chromic acid and may offer retarded corrosion resistance for substrate surfaces.

For such acids, taken in conjunction with the above formula and when $R_1$ and $R_3$ are taken separately, the radicals represented by $R_1$ are typically hydrogen, alkyl, or aryl, $m$ is an integer of zero through five, both inclusive, and the radicals as represented by $R_3$ can be hydrogen, R', or substituted R'. Such radicals as represented by substituted R' may have substitutions selected from the group consisting of amino, carboxyl, carbamyl, ureido, guanidino, imidazolyl, and indolyl. Hence, when the term "substituted R'" is used in connection with the amino acids, it is meant to include such radicals as carboxyl substituted alkyl, ureido substituted alkyl, and the like. When $R_1$ and $R_3$ are taken together they represent a heterocyclic ring wherein the ring atoms are carbon and nitrogen atoms with the substitutions on the ring atoms being hydrogen or such substitutions as represented by R'.

The suitable amino acids for the practice of this invention are chiefly the alpha-amino acids, i.e., those acids in the above formula 1 wherein m is zero. These acids include monoamino-monocarboxylic acids such as valine, showing a representative alkyl for $R_3$, monoamino-dicarboxylic acids, as for example aspartic acid, having an example of a carboxyl substituted alkyl for $R_3$, diamino-monocarboxylic acids, e.g., lysine, wherein $R_3$ is amino substituted alkyl, as well as heterocyclic amino acids such as proline. In these alpha amino acids $R_1$ is hydrogen, except in the acid histidine wherein $R_1$ and $R_3$ are taken together to form a heterocyclic ring.

Also, the amino acids can be beta-amino acids. i.e., acids wherein $m$ in the foregoing formula is one, for example beta-alanine wherein $R_3$ is hydrogen, or beta-amino hydrocinnamic acid wherein $R_3$ is phenyl. Moreover, such amino acids may be gamma-amino acids where m of the above formula is two, such as gamma-amino butyric acid having $R_3$ as hydrogen, or gamma-amino valeric acid having an alkyl group for $R_3$. Additional amino acids include delta-amino acids wherein m is three such as delta-amino valeric acid. Furthermore, mixtures of any such amino acids can be employed.

Suitable amino acids which may be used in the coating composition in addition to those mentioned hereinabove include glutamic acid, phenylalanine, i.e., $R_3$ is representative of alkaryl, N-ethyl glycine wherein $R_1$ is a typical alkyl radical, histidine, glycine, asparagine where $R_3$ is carbamyl substituted alkyl, N-phenyl glycine wherein $R_1$ is phenyl, citrulline, tryptophane, and arginine. Some or all of these compounds may be furnished by their lower alkyl esters or by their hydrochloride salts where such exist, for example glycine hydrochloride.

Additionally, the organic component may be supplied by a compound having a group corresponding to the structure —CONH—. For such compounds n in the foregoing formula is zero and when $R_1$ and $R_2$ are taken together, the representative compounds for the resulting structure have a heterocyclic ring. In such heterocyclic ring the ring atoms are carbon and nitrogen with the nitrogen atoms being represented in the ring by the structure —NH—CO—. The heterocyclic ring carbon atoms have substituents such as hydrogen or members represented by R'. Moreover, two adjacent heterocyclic ring carbon atoms may also form a portion of an aromatic ring, e.g., in the compounds carbostyril and phthalimidine. Furthermore, as in the compound isatin two carbon atoms in the ring may bear oxo substituents so long as only one of the two ring carbon atoms adjacent a nitrogen atom contains such oxo substituent.

For convenience, these compounds are often referred to herein as lactams, but this reference is meant to include compounds referred to herein for convenience as dilactams, e.g., 2,5-piperazinedione. The suitable lactams which may be used in the practice of this invention, in addition to those mentioned hereinabove, include the gamma lactams, such as gamma-butyrolactam, and delta-lactams, e.g., delta-valerolactam, as well as the epsilon-lactams, for example, epsilon-caprolactam. Other lactams which may be employed include oxindole, isatin, N-methylisatin, omega-lauric lactam, 6-methyl-2-piperidone, and p-methylisatin. Also, mixtures of these lactams may be used in the organic component as well as lactams in mixture wtih amino acids or admixed with other group (B) organic compounds.

Furthermore, the organic component can be supplied by compounds wherein n in the foregoing formula is zero and $R_1$ and $R_2$ are taken separately. For compounds of this structure, $R_1$ may be hydrogen, or R', or substituted R', and $R_2$ can be hydroxyl, carbamyl, R', or substituted R'. However, both $R_1$ and $R_2$ must not be substituted R' in the same compounds. For the purpose of these compounds R' is as defined above but substituted R' can have substituents selected from the group consisting of carboxyl, carbamyl, and a substituent of the formula

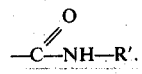

Representative compounds corresponding to this formula wherein *n* is zero and $R_1$ and $R_2$ are taken separately may be more conveniently termed diamids, e.g., oxamide, wherein $R_1$ is hydrogen and $R_2$ is carbamyl, or succinamide wherein $R_1$ is hydrogen and $R_2$ is representative of a carbamyl substituted alkyl group, and phthalimide, wherein $R_1$ is hydrogen and $R_2$ is typical of carbamyl substituted aryl. Other compounds corresponding to this structure include substances which may be referred to as acid-amids, e.g., succinamic acid, wherein $R_1$ is hydrogen and $R_2$ is representative of carboxyl substituted alkyl. Additional compounds included by this structure are aceturic acid with $R_1$ being typical of carboxyl substituted alkyl, and $R_2$ representing alkyl, and hippuric acid wherein $R_1$ is carboxyl substituted methyl and $R_2$ is phenyl.

The organic component should be present in the coating composition in an amount between about 1 and about 100 grams per liter of such composition. The presence of less than about 1 gram per liter of such component in the coating composition is uneconomical since it requires the evaporation of large amounts of liquid. Using more than about 100 grams of organic component per liter of coating composition may cause solubility problems when water alone is the volatile liquid and additionally can lead to some sacrifice in the adhesion of subsequently applied paints. Preferably for good paint adhesion and economy, the coating composition contains between about 20–65 grams of organic component per liter.

Additionally the molar ratio of $CrO_3$ to the organic component should be within the range of about 9:1 to about 0.7:1. A molar ratio of chromic acid to the organic component of greater than about 9:1 may provide unwanted chromium in the resulting residue, i.e., chromium present in the residue from the coating composition, which can be liberated if a water wash is applied to the film. A mole ratio of less than about 0.7:1 for the chromic acid to the organic component can provide cured films containing insufficient chromium for enhanced corrosion resistance. Preferably for enhanced corrosion resistance without the substantial formation of unwanted chromium in the cured film, the coating composition contains a molar proportion of $CrO_3$ to the organic component within the range of about 7:1 to 1.5:1.

In addition to the substituents discussed hereinabove, the chromic acid solution may contain a non-ionic wetting agent such as alkylphenoxypolyoxyethylene ethanol, e.g., commercial nonylphenoxypolyoxyethylene ethanol, in concentrations typically up to about 3 grams per liter of the composition.

Before applying the coating composition to the substrate, it is desirable that the substrate is thoroughly cleaned. The use of a commerical alkaline cleaning composition which combines washing and mild abrasive treatments can be employed for this purpose, e.g, an aqueous trisodium phosphate-sodium hydroxide cleaning solution. In addition to cleaning, the substrate can undergo cleaning plus etching, e.g., with hydrofluoric acid etching agent. To accomplish the substrate etching and instead of applying only the chromic acid solution, a mixture can be applied which incorporates an etching agent in with the chromic acid solution. In lieu of a clean metal surface, an additional suitable surface for applying the coating composition is one wherein the metal substrate has been treated to exhibit a loose, powdery residue which is retained on the substrate for subsequent application of the coating composition. Such residues can promote adhesion for later applied paints.

Whether applied alone or in mixture with an etching agent, the coating composition may be applied to the substrate by any of the various methods for applying paint to a metallic substrate, for example, dip coating, roller coating or reverse roller coating, curtain coating, airless spray, rotary brush coating, pressure spray, or combinations of such methods such as spray and brush techniques. The chromic acid composition can be suitably applied as a "mill finish", i.e., factory applied. For economy, these compositions are applied in an amount yielding, after curing below about 600 milligrams of cured film, which is also referred to herein as a "coating residue", per square foot of substrate metal and, advantageously, for enhanced adhesion of subsequently applied and cured top-coatings, are applied in an amount to yield at least about 35 milligrams per square foot of such residue. Preferably, for best economy with excellent adhesion, the coating composition is applied in an amount between about 40,100 milligrams per square foot.

After application of the chromic acid composition, the substrate is heated, such as by infrared baking, at a substrate temperature, and for a period of time, sufficient to vaporize volatile liquid in the composition and deposit on the surface a composition residue which is most often at least substantially water insoluble, as well as adhering, i.e., "bonded", to the surface. After heating, the substrate surface is ostensibly dry to the touch, and the residues sufficiently bonded to the surface to withstand typically at least about two inch-pounds of impact as determined by the impact test described in detail hereinafter in connection with the examples.

Heating may be initiated essentially as soon as the composition is applied, for example, baking at a substrate temperature of 400°F. or greater within 10 seconds or less of application. Generally, however, especially for factory applied compositions, air drying, e.g., within the temperature range from about 65° to about 200°F. and for a time of a few minutes or less, will precede heating. The resulting material, after such air drying, is then usually baked, especially for the water based coating composition, by raising the substrate to a temperature advantageously within the range from about 240° to about 550°F. Temperatures below about 240°F. can often provide for prolonged, inefficient curing while temperatures above about 550° can result in sime final film degradation. The substrate is heated within the above temperature range for at least about 5 seconds, but, for economy, the heating is not continued for substantially more than about 10 minutes. Curing for less than about 5 seconds can be insufficient to prepare a tough, adherent undercoating.

The preferred baking temperatures varies somewhat, according to the particular coating composition used. For efficiency, infrared or radiant heat is preferred. In the circumstances in which tertiary butyl alcohol os used as a coating composition medium, a substrate baking temperatures of about 210°–340°F. is sufficient. When water alone is used, a higher temperature of preferably about 350°–400°F. can be employed. Water and tertiary butyl alcohol can be used together as a mixed composition medium, in which case the baking temperature is preferably within the range of about 350°–400°F.

A weldable primer may be applied where a topcoating is desired but weldability is to be retained. Such primers can contain a particulate, electrically conductive pigment of aluminum, copper, cadmium, carbon, zinc, or magnetite, i.e., the magnetic oxide of iron. Their composition and use has been more fully disclosed in copending U.S. application Ser. No. 642,133, now abandoned, which application has been assigned to the assignee of this application. Additional topcoatings include any suitable paint, i.e., a paint, other primer, enamel, varnish, or lacquer. Such paints can contain pigment in a binder or can be unpigmented, e.g., generally cellulose lacquers, rosin varnishes, and oleoresinous varnishes, as for example tung oil varnish. The paints may be solvent reduced or they can be water reduced, e.g., latex or water-soluble resins, including modified or soluble alkyds, or the paints may have reactive solvents such as in the polyesters or polyurethanes. Additional paints include oil paints, including phenolic resin paints, solvent-reduced alkyds, epoxys, acrylics, vinyl, including polyvinyl butyral and oil-wax-type coatings such as linseed oil-paraffin wax paints. The paints can be applied as mill finishes.

When reference is made herein to welding of the substrate, it is to be understood that the subsequent welding under consideration can be spot welding, i.e., localized electrical resistance welding, or seam welding such as with roller electrodes. Typically spot welding can be performed with copper electrodes at electrode pressures from about 100 to about 5,000 pounds, and at 4–5 volts and about 10,000–17,000 amp-sec. operating conditions, with a weld time, in cycles, from about 4 to about 400 based on a 60 cycle frequency.

The following examples show ways in which the invention has been practiced but should not be construed as limiting the invention. In the examples the following procedures have been employed.

Preparation of Test Panels

Steel tests panels (4 × 12, and all being cold rolled, low carbon steel panels) are prepared for coating application by immersing in water which has incorporated therein 4 ounces of cleaning solution per gallon of water. The cleaning solution is 25 percent by weight of tetrasodium pyrophosphate, 25 percent by weight of disodium phosphate, and the balance sodium hydroxide. The bath is maintained at a temperature of 160°–180°F. After dipping the panels are rinsed with warm water while scrubbing with a soft bristle brush. These panels are designated "bare steel" panels in the examples.

Pretreatment of Panels

Pretreated panels are obtained from a coil of cold rolled, low carbon steel which is run at 12 feet per minute through a phosphoric acid bath maintained at 120°F. and containing 15 milliliters of free phosphoric acid per liter of the bath. The coil is permitted to simply air dry at room temperature to obtain a loose, powdery residue on the steel substrate and an average coating weight of about 36–37 milligrams per square foot of the powder.

Application of Coating Composition and Curing

Unless otherwise indicated in the examples, the coating composition is applied by dipping the test panel into such composition, removing and draining excess composition from the panel, air drying at room temperature until the coating is dry to the touch and baking under infrared lamps or baking in a convection oven at a substrate temperature up to 450°F. for a time up to 6 minutes.

Corrosion Resistance Test (ASTM B-117-64)

Corrosion resistance of coated panels is measured by means of the standard salt spray (fog) test for paints and varnishes, ASTM B-117-64. In this test, panels are placed in a chamber kept at constant temperature where they are exposed to a fine spray (fog) of a 5 percent salt solution for specified periods of time, rinsed in water and dried. The extent of corrosion and film removal on the test panels can then be measured in inches of coating failure away from scribe lines as explained in greater detail hereinafter in the examples.

Impact Test

In the impact test, a metal ram of specified weight, in pounds, with a hemispherical contact surface is allowed to drop from a predetermined height in inches onto the test panel. The impact is measured in inch-pounds and several tests may be made with differently weighted rams. Paint removal is determined by inspection of the convex (reverse) surface. Figures presented represent maximum amounts withstood by the panel without coating removal to bare metal.

Condensing Humidity Test

Water is heated and mechanically circulated in the bottom of a cabinet to produce a condition of 100 percent humidity in the cabinet and a temperature for the ambient steam within the cabinet of 120°F. Panels are placed in the cabinet at about a 15° angle to the water surface; the bottom edge of the panels is about 8 inches above the water surface and the top edge about 10 inches above the water surface. To terminate the test, panels are simply removed from the cabinet, air dried and visually inspected for coating failure, e.g., blisters and pin hole rust spots, on the face of the panel, that is, not around the panel edges.

Coin Adhesion

An uncirculated, i.e., freshly minted, nickel coin is firmly secured in vise-grip pliers; the pliers are manually held in a position such that a portion of the rim of the nickel coin contacts the coated substrate at about a 45° angle. The nickel coin is then drawn down across the panel for about 2 inches. The type of coating flaking and/or chipping is evaluated qualitatively by visual observance, and the panels are compared with the condition of a standard test panel.

Paint Films

The paint films (topcoats) referred to in the examples are either a commercial white alkyd enamel topcoat or a commercial water-based red oxide electrocoat primer which are applied to the panels by dipcoating, for the enamel, and by electrocoat. The alkyd paint is prepared from a modified alkyd resin based upon a system of partially polymerized phthalic acid and glycerine. The paint contains 50 weight percent solids and has a viscosity of 50 seconds as measured on No. 4 Ford cup at 70°F. After coating panels with the enamel, the coating is cured by baking in a convection oven for 20 minutes at a temperature of 320°–325°F.

The electrocoating primer is a water emulsion, pigmented with red oxide of iron, and has a resin system derived from polycarboxylic acids plus a water miscible glycol ether coupling agent. The amine employed in the emulsion is diethylamine. The primer initially contains about 40 weight percent solids but is diluted before use at a volume ratio of primer to water of about 1:3–3.5.

Example 1

In this example data are reported for the coin adhesion and impact resistance test. In the table below a comparative test panel, designated as a "Bonded" test panel, is a commercial panel containing an average weight of about 40–50 milligrams per square foot of a tightly adhering, corrosion inhibiting iron phosphate substrate coatings. Such Bonded panels have met with general acceptance as a standard for performance when evaluating corrosion inhibiting, phosphate-containing coatings in, for example, the automotive and household appliance industries.

The balance of the compositions in Table I below are applied as aqueous coating solutions. Each of these coating solutions contain about 0.2 milliliter per liter of coating composition, of a nonionic wetting agent bearing a nonyl phenol hydrophobe, and having an HLB number of 16, a solidification temperature of 37°C. and an apparent specific gravity at 4°/20°C. of 1.077, and are applied in the manner described hereinbefore. Panel surfaces receiving the aqueous coating solutions are all phosphoric acid pretreated surfaces. In Table I below, all panels contain the electrocoating primer as a topcoat prior to testing. The results shown in the table for the impact test are presented in inch-pounds for incipient paint removal on the convex surfaces of panels and the results given are for two separate tests.

Table I

| Ingredients | Concentrations grams/liter | Coin Adhesion | Impact Test |
|---|---|---|---|
| Bonded Surface | 0 | good-excellent | 30,40 |
| CrO₃ | 40 | good-excellent | 30,70 |
| Glutamic Acid | 18.7 | | |
| CrO₃ | 40 | good-excellent | 50,50 |
| DL-Aspartic Acid | 16.9 | | |
| CrO₃ | 40 | good-excellent | 60,70 |
| DL-Alanine | 11.3 | | |
| CRO₃ | 40 | good-excellent | 40,40 |
| Histidine | 19.7 | | |

These results thus show that the compositions of the present invention provide coatings underneath the primer topcoating which offer excellent adhesion for such topcoating, which adhesion is comparable to, or can surpass, the adhesion obtained by the comparable Bonded standard.

Example

In Table II below, the results of the condensing humidity test are presented for coating compositions of the present invention together with both a chromic acid-succinic acid-succinimide composition, as well as a chromic acid-succinic acid-dl-aspartic acid composition each of which is included for comparative purposes. All compositions contain about 0.2 milliliters per liter of the wetting agent described in Example 1. All coatings are applied and cured in the manner described hereinabove and are applied to bare steel panels. Where slight coating failure has been noted in the table, this typically refers to some pinpoints of red corrosion around a half-inch width at the edge of the panel face commensurate with a rust-free condition on the balance of the face, or some pinpoint corrosion on the face with an essentially rust-free panel edge. Medium coating failure refers to a condition of more aggravated apparent corrosion as well as more extensive distribution of corrosion failure over the surface of the panel.

Table II

| Ingredients | Concentration grams/liter | Condensing Humidity |
|---|---|---|
| CrO₃ | 40 | 91.5 hours, medium failure |
| Adipic acid | 20 | |
| Succinimide | 10 | 3 hours, initial, trace rust |
| CrO₃ | 40 | 24 hours, 3% rust |
| Succinic acid | 15 | |
| Aspartic acid | 10.1 | 96 hours, medium to heavy failure |
| CrO₃ | 40 | 168 hours, slight failure |
| Glutamic acid | 18.7 | |
| CrO₃ | 40 | 168 hours, slight failure |
| Glutamic Acid | 18.7 | |
| CrO₃ | 40 | 120 hours, slight failure |
| DL-phenylalanine | 21.0 | |
| CrO₃ | 40 | 9 hours, rust free |
| Succinamide | 8.8 | 24 hours, initial, trace rust |
| CrO₃ | 40 | 9 hours, rust free |
| gamma-butyrolactam | 10.8 | 24 hours, 3% rust |

As is seen from these results, the compositions of the present invention can be comparable to, but generally outperform the comparative dicarboxylic-acid-containing compositions under condensing humidity conditions.

Example 3

In Table III below, data from the salt spray test are set forth for coating compositions of the present invention and a chromic acid-suberic acid coating composition which is included as a basis of comparison. The wetting agent of Example 1 is present in all compositions in an amount of about 0.2 milliliter per liter. Compositions are applied to bare steel panels and are applied and cured in the manner described hereinbefore. For all panels the alkyd enamel topcoat is used. The figures presented in the table, e.g., "0/32", indicates the inches of coating failure away from scribe lines which have been cut through to the steel, in an X configuration on the panel surface, prior to subjecting the panels to the test.

Table III

| Ingredients | Concentration grams/liter | Salt Spray 168 hours |
|---|---|---|
| $CrO_3$ | 30 | 1/32 |
| Suberic acid | 17 | |
| $CrO_3$ | 40 | 0/32 |
| Glutamic acid | 18.7 | |
| $CrO_3$ | 40 | 0.5/32 |
| DL-phenylalanine | 21.0 | |
| $CrO_3$ | 40 | 0/32 |
| DL-alanine | 11.3 | |
| $CrO_3$ | 40 | 0.5/32 |
| Caprolactam | 14.6 | |
| $CrO_3$ | 40 | 0.5/32 |
| gamma-butyrolactam | 10.8 | |

These results disclose the enhanced performance obtainable with compositions of the present invention, as corrosion-inhibiting coatings under salt spray conditions, particularly when compared with the coating provided by the dicarboxylic-acid-containing composition.

Example 4

The condensing humidity test described hereinabove is conducted on two panels. However, the test is terminated and the panels removed from the cabinet when insipient coating failure is detected by visual inspection of the panels maintained in the cabinet. One panel is coated with a bonding coating composition containing 40 g./l. (grams per liter) chromic acid and 14.6 g./l. caprolactam. As a basis for comparison, the bonding coating composition for the other panel is made up from 40 g./l. of chromic acid, 20 g./l. of adipic acid, and 10 g./l. succinimide.

The wetting agent of Example 1 is present in both compositions in an amount of about 0.2 milliliter per liter. The bonding coatings are applied and cured in the manner described hereinabove. The panel coated with the comparative chromic acid/adipic acid/succinimide bonding coating composition demonstrates insipient coating failure after 3 hours of testing, but the panel coated with the chromic acid/caprolactam bonding coating composition does not demonstrate insipient coating failure until 14 hours of condensing humidity testing. Hence, the bonding coating composition of the present invention demonstrates excellent corrosion protection for the metal substrate which is greatly enhanced over that obtained with the comparative dibasic-acid-containing coating composition.

Test panels, referred to hereinafter as "coupons", are coated with the chromic acid/glutamic acid composition shown hereinabove and, following curing, resulting coupons are subjected to electrical resistance spot welding. This is performed with copper electrodes at an electrode pressure of 550 pounds using a weld time of nine cycles based on a 60 cycle frequency, and a weld heat of 12,500 amp-sec. During such welding, no metal expulsion is observed and no sticking of the coating to the electrodes is visibly apparent. Additionally, the welded coupons pull a good "button" in the peel test. In this test, two coupons which have been welded together by at least one spot weld are peeled apart past the weld, thereby tearing the welded spot from one of the coupons. Hence, one coupon has a hole at the place of the spot weld and the other coupon has a button of metal, at the place of the spot weld. The electrodes for the welding are circular and have a diameter of 0.250 inch. The button pulled from the test coupon, measured across its narrowest apparent diameter with a micrometer caliper calibrated for measuring to the nearest 0.001 inch, must be virtually 0.250 inch across to pull a good button. In view of the above, these panels are considered to be highly suitable for such electrical resistance spot welding.

It is to be understood that, although the invention has been described with specific reference to particular embodiments thereof, it is not to be so limited, since changes and alterations therein may be made which are within the full intended scope of this invention as defined by the appended claims.

We claim:

1. The method of protecting a ferruginous metal substrate surface with an adherent, corrosion-resistant, hexavalent-chromium-containing coating composition residue, wherein the protected surface exhibits enhanced corrosion resistance, which method comprises:

applying to said surface a hexavalent-chromium-containing coating composition supplying an amount, after vaporization of volatile substituents from applied composition, sufficient to provide above about 25 milligrams of chromium, and not substantially in excess of about 600 milligrams of total composition residue, per square foot of coated substrate surface; and heating said substrate at a temperature maintained within the range from about 210°F. to about 550°F. and for a time of at least about 5 seconds to vaporize volatile substituents from the applied composition and deposit on the surface a residue at least substantially bonded to said surface;

wherein said coating composition comprises a volatile liquid having a boiling point below about 100°C. at normal pressure and having dispersed therein coating ingredients consisting essentially of:

a. chromic acid in an amount below about 400 grams per liter; and b. an organic component of compounds free from halogen, sulfur, and hydroxyl substituents, said compounds being selected from the group consisting of carbostyril, phthalimidine, 2,5-piperazinedione, gamma-butyrolactam, delta-valerolactam, epsilon-caprolactam, oxindole, isatin, N-methylisatin, omega-lauric lactam, 6-methyl-2-piperidone, p-methylisatin, oxamide, succinamide, phthalimide, succinamic acid, aceturic acid, hippuric acid, and mixtures of same, and amino acids having from one to six carbon atoms, inclusive, linking an amino group with a carboxyl group, said amino group having one valence satisfied by substituents selected from the group consisting of hydrogen, lower alkyl, and phenyl; and
with the total weight of compounds from said *b* component being from about 1 to 100 grams per liter of the coating composition, and with the mole ratio of $CrO_3$ to the total of said *b* component compounds being within the range of about 9:1 to about 0.7:1.

2. The method of claim 1 wherein volatile components of said coating composition are at least in part evaporated from the applied composition prior to said heating.

3. A coated ferruginous metal substrate comprising a coating on the surface of said substrate of not substantially in excess of about 600 milligrams per square foot, including above about 25 milligrams of chromium, and being the residue obtained upon heating an applied corrosion-resistant, hexavalent-chrominum-containing coating composition at a temperature maintained within the range from about 210°F. to about 550°F. and for a time of at least about 5 seconds to vaporize volatile substituents from said coating composition and deposit said residue at least substantially bonded to said surface, wherein said coating composition comprises a volatile liquid having a boiling point below about 100°C. at normal pressure and having dispersed therein coating ingredients consisting essentially of:

a. chromic acid in an amount below about 400 grams per liter; and b. an organic component of compounds free from halogen, sulfur, and hydroxyl substituents, said compounds being selected from the group consisting of carbostyril, phthalimidine, 2,5-piperazinedione, gamma-butyrolactam, delta-valerolactam, epsilon-caprolactam, oxindole, isatin, N-methylisatin, omega-lauric lactam, 6-methyl-2-piperidone, p-methylisatin, oxamide, succinamide, phthalimide, succinamic acid, aceturic acid, hippuric acid, and mixtures of same, and amino acids having from one to six carbon atoms, inclusive, linking an amino group with a carboxyl group, said amino group having one valence satisfied by substituents selected from the group consisting of hydrogen, lower alkyl, and phenyl; and with the total weight of compounds from said *b* component being from about 1 to 100 grams per liter and the coating composition, and with the mole ratio of $CrO_3$ to the total of said *b* component compounds being within the range of about 9:1 to about 0.7:1.

* * * * *